May 7, 1946. C. L. SCHULZ 2,399,894
SYSTEM OF FEEDING AND ASSORTING BALLS OF DOUGH
Filed Oct. 28, 1943 3 Sheets-Sheet 1
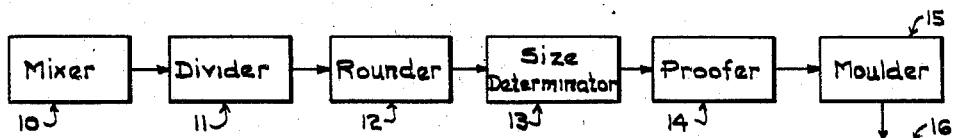
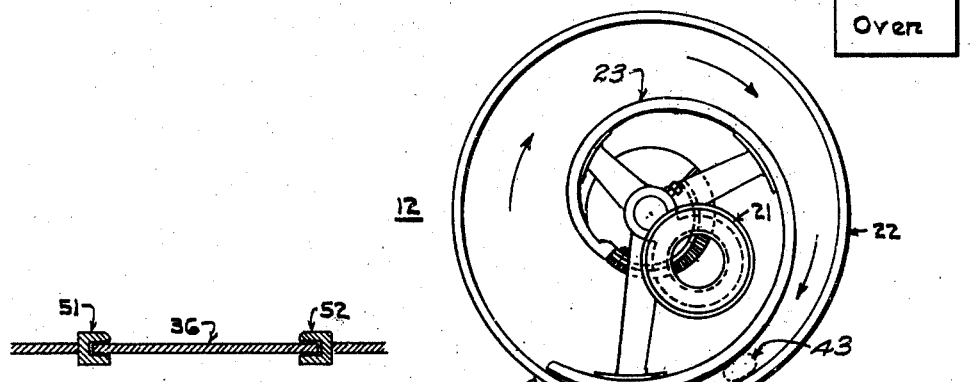
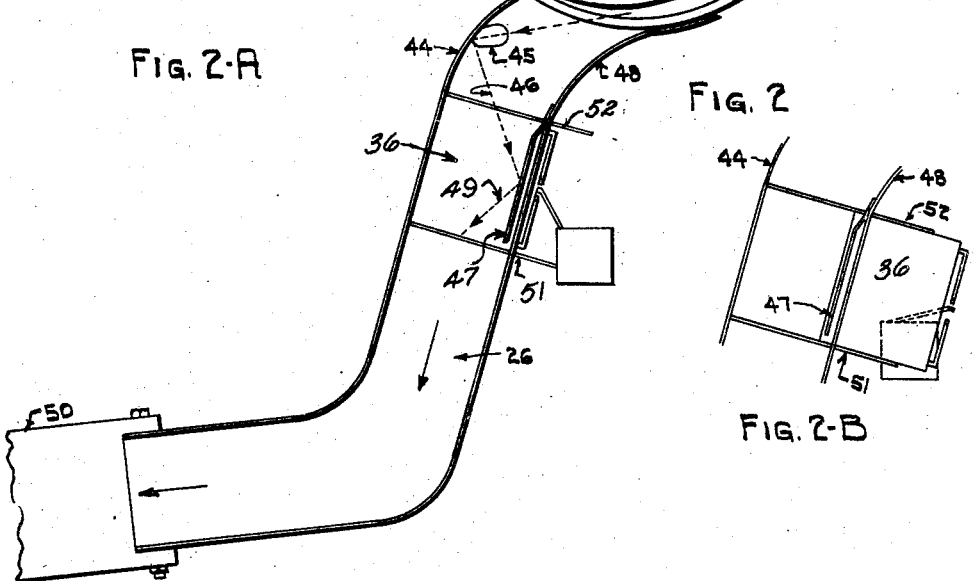
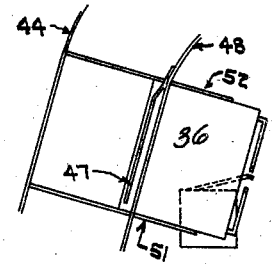
INVENTOR.
Charles L. Schulz.
BY Virgil E. Woodcock
Attorney

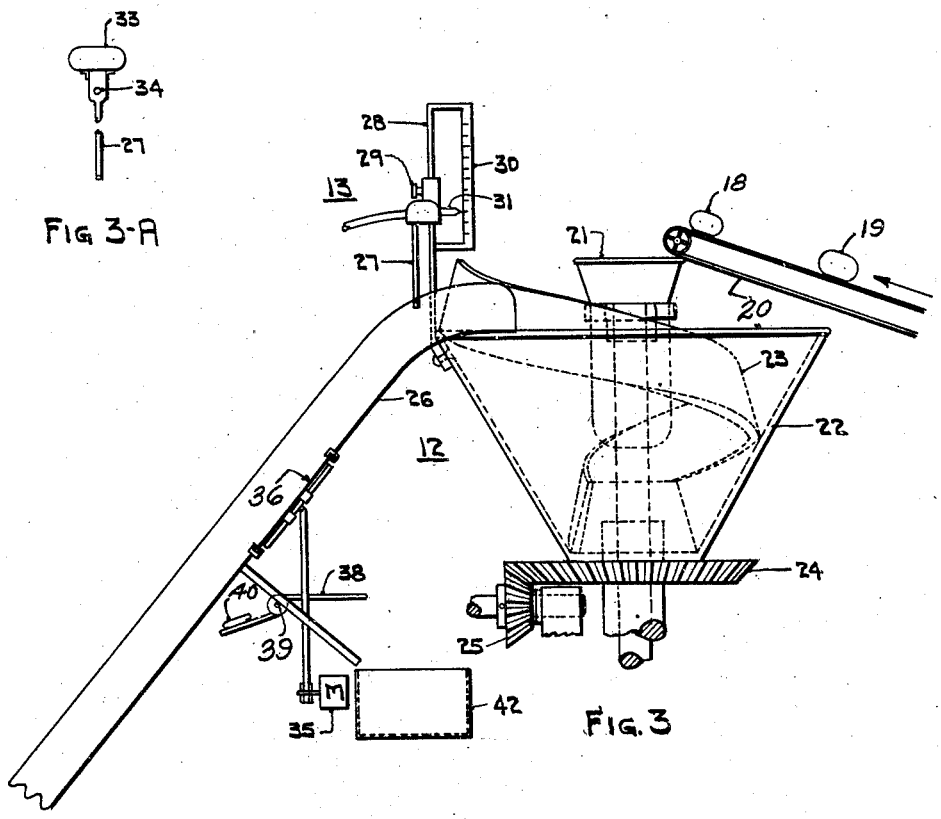

May 7, 1946. C. L. SCHULZ 2,399,894
SYSTEM OF FEEDING AND ASSORTING BALLS OF DOUGH
Filed Oct. 28, 1943 3 Sheets-Sheet 3
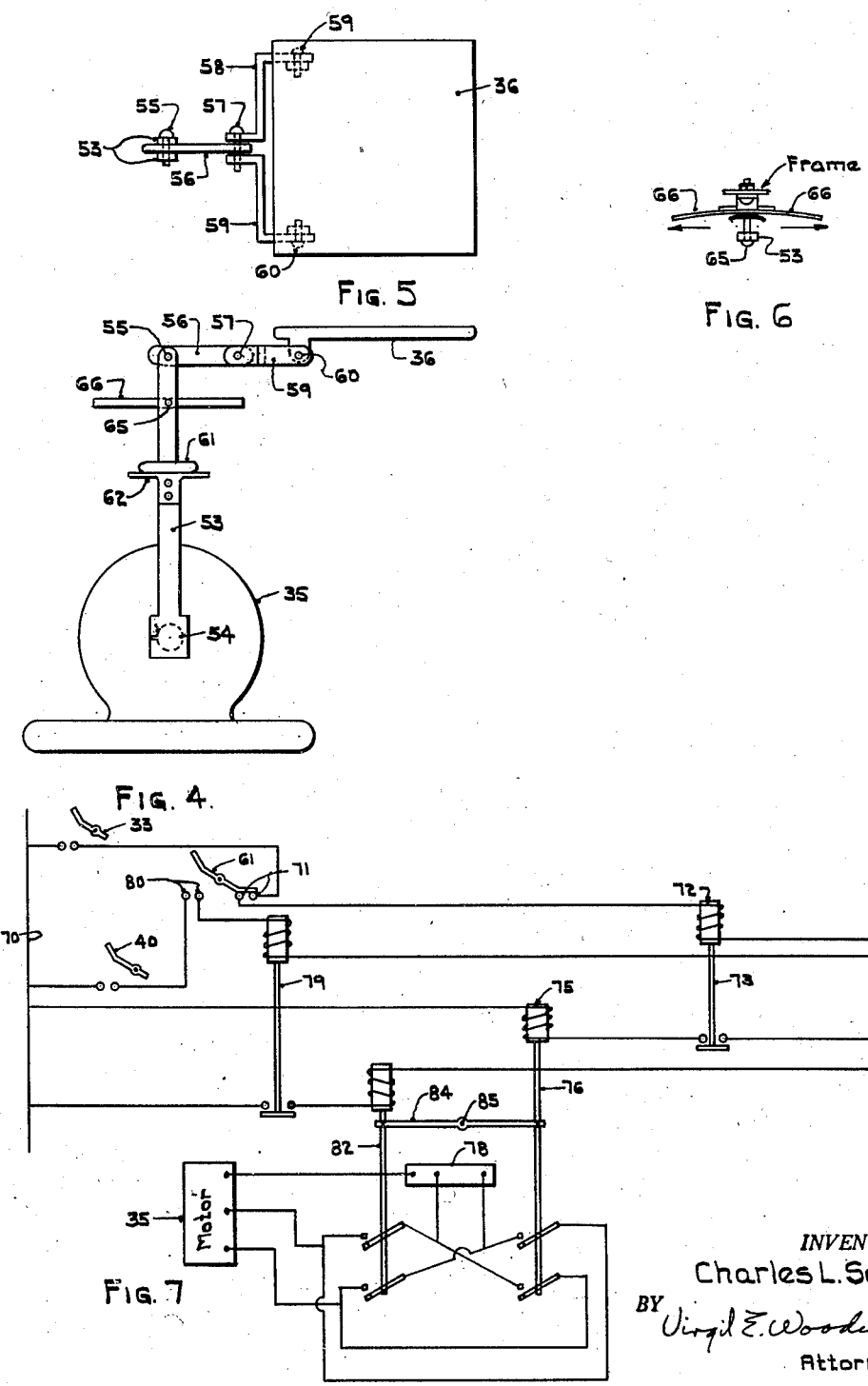
INVENTOR.
Charles L. Schulz.
BY Virgil E. Woodcock
Attorney Patented May 7, 1946

2,399,894

UNITED STATES PATENT OFFICE 2,399,894

SYSTEM OF FEEDING AND ASSORTING BALLS OF DOUGH

Charles L. Schulz, Pottstown, Pa.

Application October 28, 1943, Serial No. 508,016

7 Claims. (Cl. 209—88)

This invention relates to dough feeding systems of the type applicable to bakeries in which individual loaves of bread are produced in large quantity, and has for an object the provision of a reliable and relatively inexpensive method of, and means for, eliminating from the system what are known in the bakery trade as doubles.

In carrying out the present invention in one form thereof, each lump of dough, while in rapid transit, is measured as to size, and in the event any lump is of materially larger size than is intended for the production of the particular loaf being made, it is automatically removed from the system. A double, or two lumps of dough each originally intended to form separate loaves of bread, if permitted to be fed to a molder, provides excess dough which is pressed from the mold, and may, and frequently does, require that the entire system be shut down in order to clean the excess dough from the mold or molder. By providing a trap door, preferably slidable, and forming a part of a chute, each double is caused to drop therethrough, and the trap door to close prior to the arrival of lumps of dough of normal size.

In terms of output, systems embodying the present invention operate without the need for the cleaning operations and the shutting down of the system. In consequence, there is a material increase in production over prior art systems in which no satisfactory provision has been made for the elimination of doubles.

For a more complete understanding of the invention, reference is to be had to the following detailed description and to the drawings in which:

Fig. 1 diagrammatically illustrates by block diagram a typical bread making system;

Fig. 2 is a plan view of a rounder and a chute to which the invention has been applied;

Fig. 2A is an enlarged section of the slide and part of the chute;

Fig. 2B is a fractional view of a part of the chute with the slide in open position;

Fig. 3 is a side elevation of the apparatus of Fig. 2;

Fig. 3A is an enlarged view of a feeler and mercury switch operated thereby;

Fig. 4 is a side elevation of the operating mechanism and slide with the chute omitted;

Fig. 5 is a plan view of Fig. 4 with the motor omitted;

Fig. 6 is a detailed plan view of the braking means or decelerator; and

Fig. 7 is a schematic wiring diagram of the circuit connections forming a part of the invention.

Referring to Fig. 1 there is diagrammatically shown a bread making system in which the necessary ingredients for the production of bread are blended together in a mixer 10. The dough is then fed to a machine known as a divider 11, which functions to separate the dough into a plurality of lumps of a size suitable for the production of loaves of bread. The divider 11 may include the plurality of rotary knives, and the separation of the dough into individual lumps is ordinarily assisted by an arrangement of conveyers whereby each lump of dough individually falls from one conveyer to a second conveyer, by which it is transported to a mechanism known as a rounder 12. The rounder has for its function the working of each lump of dough, and it also forms the lumps of dough into uniform shapes. In accordance with the present invention each lump of dough then passes through a size determinator 13, by means of which all doubles are eliminated and only the lumps of normal size are delivered to a proofer 14.

Systems of making bread operate on a time-basis; that is to say, after the ingredients have been blended together in the mixer 10 it is necessary to provide a certain amount of time during which chemical reactions take place with the evolution of gas, which, of course, lightens the dough preparatory to baking. Normally it is desired that a part of this process be completed before each lump of dough passes through the molder 15, in which a shape is imparted to it corresponding with the shape of the baking pans, and such that the final product will have the desired configuration. The proofer 14 may take the form of travelling conveyers, by means of which the lumps of dough may be retained at a desired temperature for a fixed period of time, of the order of from ten to fifteen minutes. Thereafter, each lump of dough is shaped by the molder 15 and delivered to a second proofer 16. The proofer 16 ordinarily may take the form of proof boxes, or preheaters within which the loaves of bread are retained for a time interval of from 35 to 45 minutes. At the end of this period the dough is in proper condition for baking, and it is then delivered to the oven, or ovens, 17. The quality of the bread is materially and adversely affected, if the dough does not pass directly through the system in accord with the predetermined time schedule. For example, if a double is delivered from the proofer 14 to the molder 15, not only is the molder likely to be clogged by the excess dough, but the excess dough must either be thrown away or returned to the system at a point prior to the divider, so that it may be again divided into individual lumps. In the past, the number of doubles have made the discard of the excess dough prohibitive as a matter of cost, and in consequence, the excess dough from the molder has always been returned to the system just ahead of the divider. This dough, having already passed through the proofer, is hence much farther advanced in fermentation, and since it must again pass through the proofer it produces bread of inferior quality. Not only that, but it tends to, and does, degrade the quality of the dough with which it mixes. The whole batch is adversely affected.

In carrying out the present invention in one form thereof, all doubles, or lumps of dough of abnormal size, are eliminated prior to their delivery to the proofer. In this manner they do not adversely affect the quality of the entire batch, nor do the chemical reactions, characterizing the fermentation process, degrade the bread resulting from the return of doubles to the system.

Referring to Fig. 3, individual lumps of dough, two of which—18 and 19—are shown, are delivered from the divider by means of a conveyer 20, to the rounder 12. The rounder 12 may be of a construction such as shown in Streich patents, Nos. 1,152,348 and 1,362,057, or of Marasso, No. 2,165,495. These patents may be referred to for a detailed disclosure of the rounder.

Briefly the lumps of dough fall from the end of the conveyer 20 into a centrally disposed well 21. From the bottom of the well each lump of dough is engaged by rollers and delivered to a region intermediate the conical drum 22 and a stationary internally mounted spiral moldboard 23. The lumps of dough are successively and continuously kneaded during their upward travel along the rotating drum 22. Rotation of the drum is effected by any suitable means such as the ring gear 24 and the driving pinion 25. Each lump of dough travelling at a substantial speed is delivered from the rounder 12 into an inclined conveyer or chute 26. As each lump of dough passes into the chute-conveyer 26 the size, thereof, is determined by the size determinator 13. Inasmuch as lumps of dough are successively rounded into oval shapes, a double, or a lump of twice the normal size, will be of considerably greater diameter. In consequence, a depending feeler 27, adjustably carried by a rod 28, is secured by a clamping means 29 in a position such that lumps of dough of normal size will pass beneath the end of the feeler 27. However, a lump of dough of abnormal size will strike the feeler and impart to it a pivotal movement. This movement is utilized to affect the closure of an electrical circuit and to insure the elimination from the system of each lump of dough of abnormal size. Any convenient scale 30, with a pointer 31, provides for the setting of the feeler 27 to conform with lumps of dough for the production of bread of differing size.

Although other means may be utilized for indicating the presence of a lump of dough of abnormal size, I have found that the pivotal feeler member 27 satisfactorily performs the size determining functions. I have further found that the electrical circuit may be made or broken, as may be desired, by providing a mercury switch 33, Fig. 3A, the position of which is under the control of the feeler 27. For example, the feeler 27 may be pivoted at 34 so that when a ball of dough moves the end of the feeler 27 in a clockwise direction, an electrical circuit is completed. As soon as the large lump of dough, or the double, operates the size determinator 13 to close the electrical circuit, a motor 35, Figs. 3, 4, and 7, is energized to move a slide 36, forming a part of the chute 26, to the open position shown in Fig. 2B and to provide an opening through which the double will fall. As it falls through the opening it strikes a feeler 38, Fig. 3, pivoted at 39, and through any convenient means, such as a mercury switch 40, closes an electrical circuit, which results in the operation of the motor 35, to return the slide 36 to its closed position shown in Fig. 2. The foregoing operations all take place prior to the arrival at the slide 36 of the next lump of dough of normal size. A container 42 is provided to receive the lumps of dough of abnormal size, and from the container 42 they may be returned to the system just ahead of the divider 11, as previously explained.

In one embodiment of the invention balls, or lumps, of dough were delivered by the rounder 12 at the rate of 52 per minute, and approximately 3,000 per hour. The rate per hour is slightly less than 60 times the rate per minute because of unavoidable variation in the operation of the divider. Nevertheless, at the foregoing rate, a thousand pounds of dough in the form of individual lumps, or balls, were delivered from the rounder 12 to the chute 26 during every 15 minutes of operation.

As best shown in Fig. 2, each rounded lump of dough is driven from the position of the lump, indicated at 43, in the direction of the arrow and against an upwardly extending side 44 of the chute 26. This side 44 is curved, as indicated, and each lump of dough strikes the curved portion at approximately the position indicated by the lump of dough 45. Its velocity at that point and its resilience are sufficient to cause it to rebound and cross the chute 26 along the path indicated by the broken-line arrow 46. The lump of dough then strikes a resilient arm 47 secured to a second upright side 48 of the chute 26. Each ball of dough rebounds from the resilient arm 47 along a path indicated by the broken-line arrow 49, and passes down the chute and onto a conveyer 50, from which it is delivered to the proofer 14, shown in Fig. 1.

It will be observed the slide 36 is substantially coextensive with the double path of each ball of dough identified by the arrows 46 and 49. This means that, with the rapid progress of each ball of dough down the chute 26, twice the average time is provided, due to the fact that the ball of dough cross the chute in one direction and then starts back across the chute in the opposite direction. Moreover, each ball of dough when striking the resilient arm 47 comes to rest before reversing its movement. In this manner adequate time is provided for each double to drop through the opening provided by the removal of the slide 36. There is entirely avoided the effect of momentum which otherwise might tend to prevent each double from dropping through the chute and out of the system.

The chute 26, as a whole, may be made of sheet metal, and the slide 36 may be mounted therein, as by the U-shaped members 51 and 52 shown in Fig. 2A.

The operating mechanism is relatively simple. As best shown in Fig. 4, it may comprise an arm 53 secured to the shaft 54 of the motor 35. The upper end of the arm 53 is bifurcated, as shown in Fig. 5, and is pivotally connected by the pin 55 with a link 56, which, at its opposite end, is pivotally connected by pin 57 to a pair of arms 58 and 59, respectively connected to depending brackets, extending from the slide 36, by pins 59 and 60. A mercury switch 61, Fig. 4, is carried by a bracket 62 suitably secured to the arm 53. The motor 35 is preferably of substantial size in proportion to the effort involved in moving the slide 36 to and from its open position. It is of substantial size in order to provide for rapid movement of the slide 36. However, to insure gradual deceleration to standstill, at opposite ends of its movement, a friction device is associated therewith. This comprises a pin 65 extending through the arm 53 to a position adjacent a curved decelerating member 66. As best shown in Fig. 6, the movement of the arm 53 to the right or left of its illustrated mid-position moves the pin 65 with it, but slightly out of engagement with the curved member 66. As the pin 65 approaches either end of the member 66, it, or a brake shoe carried therewith, engages it, and friction is developed between the engaging surfaces. This friction may be augmented by providing one of the members with suitable material such as brake lining. In any event, the friction is adequate to decelerate the arm 53 and the associated movable parts, and to bring them gradually and smoothly to standstill. The curved member 66 may be, and preferably is, somewhat resilient although of considerable strength.

With the foregoing understanding of the principles underlying the present invention, and the structure by means of which the system is to operate, many modifications within the spirit and scope of the invention will suggest themselves and suitable driving systems of other types may be utilized. In an embodiment of the invention, the disclosed system has proven quite satisfactory. The electrical connections utilized therein will now be described.

Referring to Fig. 7, the appearance of a double, or a large lump of dough, at the size discriminator causes the mercury switch 33 to close an electrical circuit, which may be traced from a supply line 70 by way of the mercury switch 61, which, it will be remembered, is carried on the arm 53, thence through the operating coil 72 of a relay 73, and to the other supply line 74. The completion of this energizing circuit causes the relay 73 to close its contacts and to complete an energizing circuit for the operating coil 75 of a contactor 76. The contactor 76 thereupon is operated to a closed position to complete the connections from a three-phase source of supply, indicated at 78, for the motor 35. The motor thereupon operates quickly and rapidly to move the slide 36 to its open position, as shown in Fig. 2B. As the slide 36 approaches its open position it is decelerated, as described above, and the mercury switch 61 operates to open contacts 71 and to close contacts 80. The opening of the contacts 71 deenergizes both the relay 73 and the contactor 76, and both move to their open circuit positions. The mercury switch 61 is in effect a limit switch and is provided to guard against overtravel by the motor 35 and in the event of failure of switches 33 and 40 properly to operate.

With the slide 36 in the open position the large lump of dough or the double, falls through the opening and strikes the feeler member 38, Fig. 3, which is thereupon moved in a clockwise direction to close the contacts of the mercury switch 40. A circuit is thereby completed, for the operating coil of a relay 79, which may be traced from the supply line 70 through the contacts of the mercury switch 40, thence through the contacts 80 of the mercury switch 61 (which, it will be remembered, are closed), the operating coil of the relay 79, and to the other supply line 74. The relay 79 thereupon moves to its closed position to energize the operating coil of a second contactor 82, which is operated to its closed position. The motor 35 is thereby energized with one of the three-phases reversed in order to produce reverse rotation of the motor 35. In this manner the motor returns the slide 36 to its closed position preparatory to the delivery, by the rounder 12 of another lump of dough. As the motor 35 returned the slide to its closed position it was decelerated by the friction device, Fig. 6, and the mercury switch 61 was again operated to open the contacts 80 and to close the contacts 71, preparatory to the operation of the size determinator in the event of the appearance of a second double, or large lump of dough.

Preferably, the contactors 76 and 82 are provided with a mechanical interlock, such as indicated by the link 84, pivoted at 85. As shown, both mechanical and electrical interlocking is provided. If a mechanical interlock is utilized, the limit switch 61 may be unnecessary, for the reason that the momentary closing of the circuit by the mercury switch 33 will produce operation of the motor 35 to open the slide 36. Since the switch 33 is only momentarily closed for a time interval equal to the passage of the large ball of dough beneath the feeler 27, the motor 35 is, in reality, energized by a large impulse, and it is then deenergized by the opening of the mercury switch 33, followed by the opening of the relay 73 and the contactor 76. Similarly, as soon as the double strikes the feeler 38, the mercury switch 40 is momentarily closed to produce reverse operation of the motor. As soon as the double falls from the feeler 38 into the container 42, the mercury switch 40 opens the circuit and the relay 79, the contactor 76, and the motor 35 are deenergized. Though it is now apparent the mercury switch 61, or its equivalent, need not be utilized, it is believed desirable in the preferred form of the invention.

In operation the foregoing embodiment of the invention has been found to be reliable and has greatly increased the output of the breadmaking machine as a whole. Instead of a mechanical size determinator a photoelectric cell and light source of the type utilized on door-openers and the like may be used. A solenoid, if of sufficient capacity may be substituted for the motor. And while still other equivalent devices may now suggest themselves, the present invention is defined by the appended claims.

What is claimed is:

1. In a system in which balls of dough are transported along a predetermined line of travel, the method of eliminating balls of dough above a predetermined size which comprises, registering the presence of balls of dough above said predetermined size at one point in the system, rapidly moving said balls of dough in one direction, arresting their movement, then moving said balls of dough at an increasing speed in another direction, and in response to the presence at said one point in the system of a ball of dough of above said predetermined size eliminating said ball of dough from the system in the region where said movement is arrested by dropping it out of said line of travel.

2. In combination, a gravity conveyer having side walls and a bottom wall having an opening therein, a closure for said opening, means for delivering balls of dough to said conveyer at high speed and in a direction such that each ball of dough strikes one side of the conveyer and rebounds therefrom, said opening being in the region where said rebound occurs, and means for moving said closure to an open position for removal through said opening of balls of dough above a predetermined size.

3. In a system in which balls of dough travel one after the other through the system, the combination of size determining structure operable by balls of dough above a predetermined size, a gravity conveyer, means for delivering balls of dough to said conveyer at high speed and in a direction such that each ball of dough changes direction after arrival on said conveyer, and means controlled by operation of said size determinator for removing from the system each ball of dough above said predetermined size, said last-named means being located in the region where each ball of dough changes its direction of travel and comprising a slide movable from a closed position where it forms a part of the bottom of said conveyer to an open position where it exposes an opening in said conveyer through which balls of dough above said predetermined size may fall.

4. In a system in which balls of dough travel one after the other through the system, the combination of size determining structure operable by balls of dough above a predetermined size, a gravity conveyer having side walls, means for delivering balls of dough to said conveyer in a direction and at a speed such that each ball of dough rebounds from one side of said conveyer, and means controlled by operation of said size determinator for removing from the system each ball of dough above said predetermined size, said last-named means being located in the region where each ball of dough rebounds from said one side of said conveyer.

5. In combination, a chute-conveyer down which balls of dough are adapted to travel under the influence of gravity, a slide movable from a closed position where it forms a part of the bottom of said conveyer to an open position providing an opening through which balls of dough may fall, means responsive to the presence of a ball of dough above a predetermined size for controlling operation of said slide for removal from said conveyer of each ball of dough above said predetermined size, and means for bringing each ball of dough to substantial standstill in the region of said slide to insure its removal whenever said slide has been moved to its open position.

6. In combination, a chute-conveyer, having side walls, down which balls of dough are adapted to travel under the influence of gravity, means for delivering balls of dough to said conveyer at high speed and in a direction such that each ball of dough strikes one side of the conveyer and rebounds therefrom, a slide located in the region of said rebound and movable from a closed position where it forms a part of the bottom of said conveyer to an open position providing an opening through which balls of dough may fall, means responsive to the presence of a ball of dough above a predetermined size for operating said slide to its open position prior to arrival thereon of said ball of dough, and means responsive to the presence of a ball of dough which has dropped through said opening for producing movement of said slide to its closed position.

7. In a system in which balls of dough rapidly pass one after the other down an inclined chute having side walls, means for delivering balls of dough to said conveyer at high speed and in a direction such that each ball of dough strikes one side of said conveyer and rebounds therefrom, the combination of a slide located in the region of said rebound and movable from a closed position where it forms a part of the bottom of said chute to an open position to provide an opening through which balls of dough may fall, driving means for operating said slide, size determining means operable by balls of dough above a predetermined size for controlling operation of said driving means to move said slide from its closed to its open position, means operable upon the removal through said opening of each ball of dough which operated said size determining means for controlling operation of said driving means to move said slide from its open to its closed position, and interlocking means for preventing control of said driving member for attempted movement of said slide in both directions at the same time.

CHARLES L. SCHULZ.